(12) United States Patent
Bruno

(10) Patent No.: US 6,778,416 B2
(45) Date of Patent: Aug. 17, 2004

(54) UNREGULATED VOLTAGE CONVERTER WITH INDEPENDENT SWITCHING

(75) Inventor: Serge Bruno, Marnaz (FR)

(73) Assignee: Somfy SAS, Cluses (FR)

( * ) Notice: Subject to any disclaimer, the term of this patent is extended or adjusted under 35 U.S.C. 154(b) by 0 days.

(21) Appl. No.: 10/211,740

(22) Filed: Aug. 2, 2002

(65) Prior Publication Data

US 2003/0034763 A1 Feb. 20, 2003

(30) Foreign Application Priority Data

Aug. 10, 2001 (FR) .............................. 01 10732

(51) Int. Cl.$^7$ .......................... H02M 7/04; G05F 1/40; G05F 5/00
(52) U.S. Cl. ........................ 363/89; 323/222; 323/265; 323/299
(58) Field of Search .......................... 363/84, 89, 125; 323/220, 222, 265, 282, 284, 299

(56) References Cited

U.S. PATENT DOCUMENTS

| | | | |
|---|---|---|---|
| 3,852,740 A | 12/1974 | Haymes | |
| 4,001,668 A | 1/1977 | Lewis | |
| 4,121,201 A | 10/1978 | Weathers | |
| 4,346,342 A | * 8/1982 | Carollo | ........................ 323/276 |
| 4,641,233 A | 2/1987 | Roy | |
| 4,755,792 A | 7/1988 | Pezzolo et al. | |
| 5,181,159 A | * 1/1993 | Peterson et al. | .............. 363/89 |
| 5,818,708 A | 10/1998 | Wong | |
| 6,529,073 B1 | * 3/2003 | Highfill et al. | .......... 330/207 P |

FOREIGN PATENT DOCUMENTS

| | | |
|---|---|---|
| DE | 3144742 A1 | 5/1983 |
| DE | 3245238 A1 | 6/1984 |
| DE | 4444612 A1 | 6/1995 |
| EP | 0 249 259 B1 | 12/1987 |
| EP | 0 249 259 A1 | 12/1987 |
| EP | 0 399 598 A2 | 11/1990 |
| EP | 0 399 598 A3 | 11/1990 |
| EP | 0 500 113 A3 | 8/1992 |
| EP | 0 500 113 B1 | 8/1992 |
| EP | 0 500 113 A2 | 8/1992 |
| EP | 0 622 889 A2 | 11/1994 |
| EP | 0 622 889 A3 | 11/1994 |
| EP | 0 622 889 B1 | 11/1994 |
| EP | 0 651 499 A3 | 5/1995 |
| EP | 0 651 499 B1 | 5/1995 |
| EP | 0 651 499 A2 | 5/1995 |
| EP | 0 763 878 A2 | 3/1997 |
| EP | 0 763 878 A3 | 3/1997 |
| FR | 2 672 448 | 8/1992 |
| FR | 2 785 735 | 5/2000 |
| GB | 2 203 003 A | 10/1988 |
| WO | WO 96/09687 | 3/1996 |

\* cited by examiner

*Primary Examiner*—Adolf Berhane
(74) *Attorney, Agent, or Firm*—Welsh & Katz, Ltd.

(57) ABSTRACT

An AC-DC voltage converter includes input terminals with a series circuit connected between the input terminals. The series circuit includes a switching element and a capacitor. The discharge of the capacitor supplies the output voltage of the converter. A control circuit controls the operation of the switching element so that the conducting state of the switching element is controlled exclusively as a function of the input voltage, while the nonconducting state of the switching element is controlled exclusively as a function of the output voltage. The converter has a good dynamic range and allows accurate measurement of current consumption at the output.

24 Claims, 5 Drawing Sheets

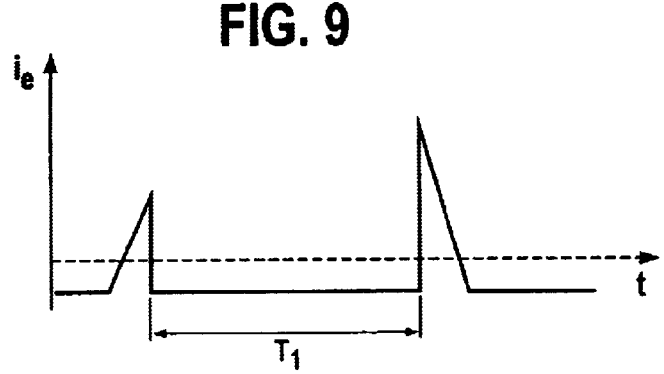
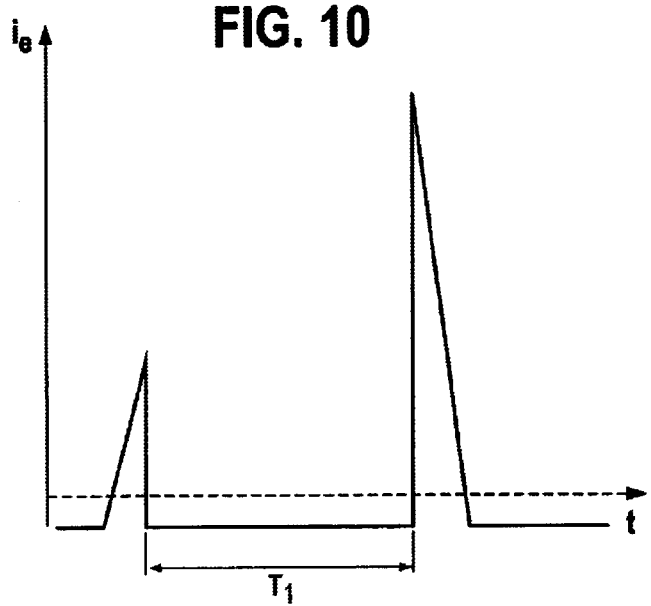
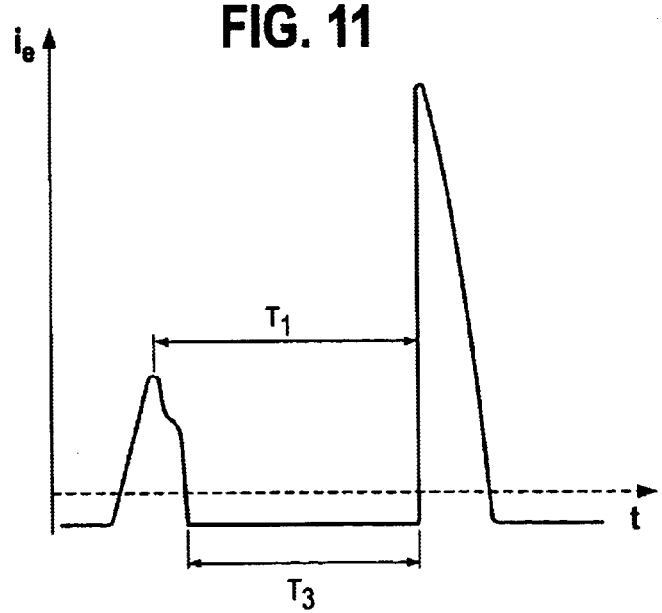

UNREGULATED VOLTAGE CONVERTER WITH INDEPENDENT SWITCHING

FIELD OF THE INVENTION

The invention relates to the field of electrical power converters, and more specifically, to AC-DC conversion circuits using a principle of intermittently charging a capacitor.

BACKGROUND OF THE INVENTION

Such converters are notably used directly for motorized products in buildings, such as small screens for solar protection, venetian blinds, etc. They make it possible to convert the AC voltage from the power mains ("mains") into a lower virtually DC voltage capable of being used to supply an actuator with a low-power DC motor, for example of the CONCEPT-25 type product manufactured by the applicant. They may also supply only the control electronics of a more powerful AC motor, for example, for roller shutters, or a single sensor combined with a radio frequency receiver or transmitter.

These converters are termed "unregulated" because they operate without their output voltage being tied to a fixed reference. This simplifies the structure of the converter and lowers the cost thereof At the input, these converters receive an AC current, which may or may not be rectified; the half-wave or full-wave rectification of an AC current is considered in the present description as known in the art and is not described. At the output, these converters provide a virtual DC voltage with an amplitude less than the peak amplitude of the input voltage. In the remainder of the description, it is assumed that the input voltage is the mains voltage. This assumption is the most common for applications in buildings. It is clear, however, that other applications are possible, and that the input AC current of the converter, whether or not rectified, is not limited to the current supplied by the mains. These converters are called low-power converters, in that it is possible to tolerate therein a lower conversion efficiency than in a high-power plant, and therefore proportionally larger losses. The output power is typically less than 50 W.

In principle, as explained for example in FIG. 1 of U.S. Pat. No. 4,641,233, the converters use the intermittent charging of a high-capacitance capacitor, hereinafter called C. In this context, the term "high capacitance" refers to capacitances which are often greater than 100 $\mu$F. However, it will be understood that the capacitance of the capacitor used is simply sufficient for maintaining enough output voltage between the periods of intermittently charging the capacitor. As a result, the capacitance of the capacitor depends on the variation in voltage accepted at the output of the voltage converter, on the output current needed, and on the charging frequency, which itself depends on the input voltage frequency. For low output currents or for a high frequency of the input voltage, a capacitor with a lower capacitance at this threshold of 100 $\mu$F could be used. A switching element, hereinafter called Q, is placed between the half-wave or full-wave rectified mains and this capacitor C, so as to charge the latter only during time periods when the mains voltage remains below a given threshold. For a given load, it is thus possible to dimension C and to choose the threshold voltage so as to comply with a given service voltage and a given waveform at the output of the converter.

U.S. Pat. No. 4,001,668 (Lewis 1973) describes a device of this sort in FIG. 4. This patent emphasizes the very high tolerance to variations in the mains voltage, allowing the use of such a circuit to supply a motor with DC current whether power is provided by 110–120 V AC mains or from 220–240 V AC mains.

The conducting and non-conducting states of the switching element Q (47) are completely determined by comparison of a voltage, which is an image of the rectified voltage, with a threshold (50, 51, 45). It should be noted that the use of a current limiter formed by a resistor RP (48) and placed upstream of the voltage measuring point makes it possible to benefit from a cumulative effect favoring fast switching of Q from an off state to a conducting state or vice-versa. In FIGS. 5 and 6, this patent clearly indicates the pulsed shape of the line current (61, 65) and of the downstream voltage waveform at the terminals of the load (therefore at the terminals of C) (62, 66). Patents filed subsequently constitute particular embodiments making it easier to control the switch Q, or improvements relating to the reduction of harmonics generated by current spikes necessary for the periodic recharging of the capacitor.

GB-A-2 203 003 (Sanderson 1987) describes, in generic terms, a topology which is slightly different but based on the same principle. In FIG. 2, a current limiting device (11) is inserted between a switching element formed by a field effect transistor and the capacitor (6), the voltage measurement for controlling the switching element being carried out on C (by means of the block referenced 10). This arrangement may remove the possibility of a cumulative effect for the effective control of Q. A device (12) is intended to take the switching element out of service when the voltage at its terminals exceeds a maximum threshold, however, this device is not described.

EP-A-0 763 878 (Helfrich 1995) describes, in FIG. 1, a converter topology using a current limiting device RP (R1), a switching element Q (Q1) and a capacitor C (C2) with composite control of Q both by the voltage upstream of RP (R6) and by the downstream voltage (R6). However, the voltage threshold is the same for the conducting and non-conducting state of the switching element.

Other embodiments of converters using this intermittent charge principle are described in DE-A-44 44612, DE-A-31 44742, EP-A-0 399 598, DE-A-32 45238, EP-A-0 249 259, FR-A-2 672 448, EP-A-0 500 113.

EP-A-0 622 889 (Wong 1994) describes a series topology (Q, C) without a current limiter. The input voltage $V_{in}$—the voltage of the rectified mains—is applied to the series circuit of the capacitor and of the switching element. This circuit is intended to allow, as in the previous cases, double charging of C per half-cycle, and therefore to reduce the waveform upstream of a regulator. The device analyzes both the voltage at the terminals of C (15) and the voltage at the terminals of Q (16). Q becomes conducting if the voltage $V_{cap}$ at the terminals of the capacitor is less than a first given threshold. Q also becomes conducting if the voltage $V_{ds}$ at the terminals of Q, which is the difference between the rectified input voltage and the voltage at the terminals of the capacitor, becomes less than a second given threshold. In one half-cycle, this allows the capacitor to be charged when the voltage increases from zero, then the capacitor to be charged when the voltage decreases to zero.

U.S. Pat. No. 4,641,233 (Roy 1985) describes, with reference to FIG. 1, a similar topology. The switching device, a bipolar transistor, becomes conducting if the output voltage of the converter (downstream voltage) is less than the chosen reference voltage. However, the switching device only becomes conducting if the voltage upstream of the switching element is less than a voltage, which is about twenty volts for an output voltage of five volts. This is obtained using a second transistor, which is switched on according to the input voltage, and which switches off the first transistor when the input voltage is too high. According to the patent, the objective of the second transistor is to prevent damaging the components as a result of switching at a high voltage.

A drawback of this device is that the threshold values for the input voltage and the output voltage are only approximately set. It is known that the conducting threshold voltage of a bipolar transistor or of a single p-n junction are not accurately defined. The proposed solution involves replacing the second transistor by a precision reference-voltage source.

There is therefore a need for a converter, which makes it possible for the switching element to be accurately controlled, allowing the capacitor to be charged by the input voltage.

A second drawback of the circuit proposed by Roy is that it artificially limits the dynamic operating range at the output. This is because this circuit prevents the switching element from conducting as soon as the upstream voltage exceeds a fixed threshold, although it is quite possible that when this threshold is reached, the capacitor C is not yet sufficiently recharged. This effect will occur on the rising edges of the rectified sinusoid. It is therefore beneficial in order to prevent limiting the dynamic operating range of the circuit to choose a high threshold for the upstream voltage.

A third drawback of the circuit proposed by Roy appears on the falling edges of the rectified sinusoid. This is because if the capacitor is discharged, the switching element becomes conducting as soon as the upstream voltage goes below the fixed threshold. If this threshold for the upstream voltage is high it becomes conducting at a higher voltage when going back below the threshold, this time during the falling edge of the rectified sinusoid. This results in an operation which is more damaging to the component, and therefore in overdimensioning thereof, and a risk of incompatibility with the electromagnetic compatibility standards. It is therefore beneficial to choose a low threshold for the upstream voltage.

The invention is based on the demonstration of these contradictory requirements in Roy's circuit and on the discovery of the corresponding problem. There is therefore a need for a converter which does not limit the dynamic operating range at the output, but which nevertheless allows the components to be protected, and which limits the risks of electromagnetic incompatibility. It would also be beneficial for the converter to be able to measure the consumption of a device which it supplies.

Moreover, it may be necessary to transmit a single signal over an electrical line for supplying actuator(s) or sensor(s), which in particular, may involve an alarm signal, a fault signal, or an acquisition signal in the actuator configuration phase, or a security signal for a sensor or the like. It is of course possible to use a medium other than the electrical supply line, for example radio transmission, or a specific conductor for transmitting the signal. However, it is beneficial to use the electrical line, which avoids providing another medium. It has been proposed in U.S. Pat. No. 3,852,740 (Haynes 1973), U.S. Pat. No. 4,121,201 (Weathers 1974) or else in U.S. Pat. No. 4,755,792 (Pezzolo 1987) to use carrier current technologies to transmit a signal over a supply line. These technologies are complex and their reliability is not guaranteed if carried out at low cost. They are not suitable for very limited data transmission. There is therefore a need for simple and reliable transmission of a signal, over the supply line of an actuator or a sensor.

FR-A-2 785 735 discloses a voltage converter. The converter has a capacitor, which is charged at most once per half-wave of the rectified input AC voltage, close to the beginning of the half-wave. Specifically, the rectified input AC voltage is applied to the capacitor through a switch. The switch is controlled to be opened whenever the output voltage across the capacitor is higher than a first threshold. The switch is controlled to be closed whenever the difference between the input voltage and the output voltage is higher than a second threshold, which may be zero. Thus, the switch is closed not exclusively based on the input voltage, but rather according to the difference between the input voltage and the output voltage. This may cause damage to the components of the converter if the switch is closed while the input voltage is high.

U.S. Pat. No. 5,818,708 discloses a voltage converter. Rectified input AC voltage is applied to a load capacitor through a switch. The switch is controlled by a latch circuit. The switch is turned on upon receiving a set input, and is turned off upon receiving a reset input. The set input of the latch is connected to a first voltage sensor, which senses the voltage provided by the rectifier. The reset input of the latch is connected to a second voltage sensor, which senses the voltage across the load capacitor. The first voltage sensor enables the set input of the latch when the voltage provided by the rectifier is higher than a low (typically zero) voltage. This turns the switch on. The second voltage sensor enables the reset input of the latch when the voltage provided by the rectifier is higher than the desired output voltage, which turns the switch off. In this converter, the capacitor is exclusively charged on the rising edge of the input voltage.

SUMMARY OF THE INVENTION

In one embodiment, the invention therefore provides a voltage converter with input terminals, a series circuit between the input terminals, the series circuit comprising a switching element and a capacitor. The discharge of the capacitor supplies the output voltage of the converter. The circuit also comprises a control circuit of the switching element, which controls the conducting state of the switching element exclusively as a function of the input voltage and controls the non-conducting state of the switching element exclusively as a function of the output voltage.

Advantageously, the control circuit controls the conducting state of the switching element when the input voltage is less than a first threshold, and controls the non-conducting state of the switching element when the output voltage is greater than a second threshold. In this case, the first threshold may be higher than the second threshold so that the capacitor is charged on both rising and falling edges of the input voltage.

In another embodiment, the invention therefore provides a voltage converter with input terminals, a series circuit between the input terminals, the series circuit comprising a switching element and a capacitor. The discharge of the capacitor supplies the output voltage of the converter. The circuit also comprises a control circuit of the switching element. This circuit sets the switching element to the conducting state when the input voltage is less than a first threshold. It also sets the switching element to the non-conducting state when the output voltage is greater than a second threshold, which is lower than first threshold

BRIEF DESCRIPTION OF THE DRAWINGS

Other characteristics and advantages of the invention will become apparent on reading the following description, given by way of example and with reference to the drawings which show FIG. 1, a schematic view of a specific embodiment of a converter according to the principle of the invention;

FIG. 9, a graph of the input current to a converter, in a first operating state of a device connected to the converter;

FIG. 10, a graph of the line current supplied to three converters, when the devices connected at the output of these converters are all in a first operating state;

FIG. 11, a graph of the line current supplied to three converters, when two of the devices connected at the output of these converters in a first operating state while the third device is in a second operating state.

DESCRIPTION OF THE INVENTION

The invention provides an AC-DC voltage converter with input terminals, a series circuit between the input terminals, where the series circuit comprises a switching element and a capacitor delivering the output voltage. The converter further comprises a circuit for controlling the switching element. The control circuit controls the conducting state of the switching element exclusively as a function of the input voltage and controls the non-conducting state of the switching element exclusively as a function of the output voltage.

As the non-conducting state of the switching element is exclusively a function of the output voltage, the switching element remains conducting when the output voltage is too low, independent of the value of the input voltage applied to the terminals of the series circuit. The capacitor continues to be charged as needed, even if the input voltage exceeds a threshold value. The converter provided therefore has a larger dynamic range than in the solution disclosed in U.S. Pat. No. 4,641,233 or GB-A-2 203 003. This is because the dynamic range of the output voltage of the converter is not limited by a threshold value of the input voltage.

As the conducting state of the switching element is exclusively a function of the input voltage, it is possible to protect the components of the circuit against any damage resulting from a conducting state under a high input voltage. It is therefore not necessary to "overdimension" or "overdesign" the components of the converter, and it is possible to limit the risk of electromagnetic incompatibility. Use of overdimensioned components, or in other words, components having higher ratings than needed, may be uneconomical The control circuit may control the conducting state of the switching element when the input voltage is less than a first threshold V1. This makes it possible to use simple elements for making the control circuit. This is also the a simple embodiment where the control circuit passes the switching element to the conducting state exclusively as a function of the input voltage.

Similarly, the control circuit may control the non-conducting state of the switching element when the output voltage is greater than a second threshold V2. This is also a simple embodiment where the control circuit passes the switching element to the non-conducting state exclusively as a function of the output voltage.

Selecting a first threshold value higher than the second threshold value makes it possible to charge the capacitor not only on the rising edge of the input voltage, but also on the falling edge of the input voltage. This increases again the dynamics of the converter and the ability of the converter to provide the output current. As discussed below, this condition, however, is not necessary, e.g., for measuring the power delivered by the converter as discussed in reference to FIG. 5 and following.

Figure 1:
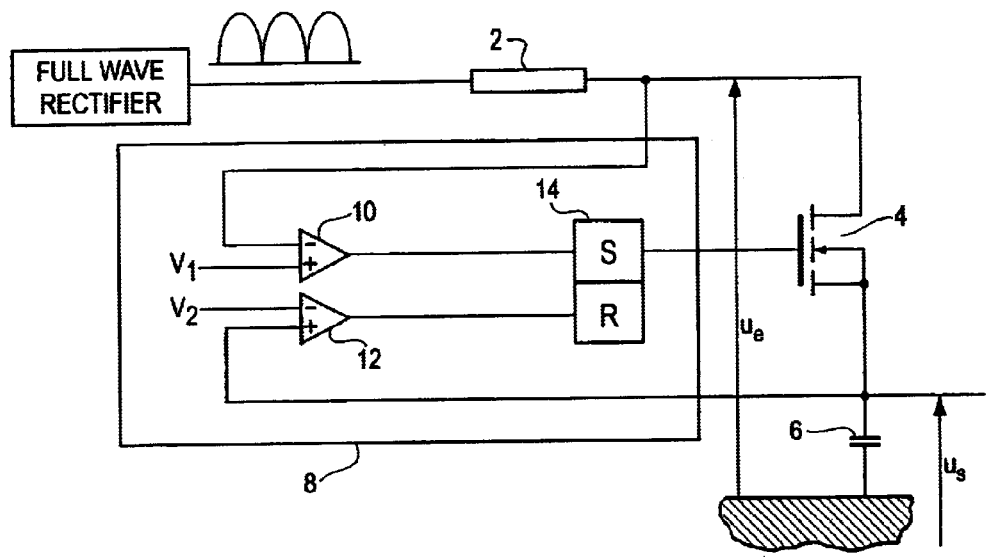

FIG. 1 shows a schematic view of a converter according to one embodiment of the invention. At the input (or upstream), the converter receives an AC voltage rectified by any suitable means, as shown diagrammatically in the figure in the case of full-wave rectification. This voltage is applied to a resistive or inductive current limiting element 2, the function of which is to limit the current flowing through the switching element and the capacitor when the switching element is conducting. Moreover, the current limiting element is connected to the series circuit of the switching element 4—an MOS transistor in the example—and of the capacitor 6. The terminals of the capacitor form the output terminals of the converter. In the figure, the voltage at the terminals of the series circuit of the switching element and of the capacitor is referenced $U_e$, which subsequently will be termed the upstream voltage, or input voltage. In the figure, the voltage at the terminals of the capacitor is referred to as $U_s$, which subsequently will also be termed the downstream voltage or output voltage. The converter also comprises a control circuit 8. The control circuit is connected to the control input of the switching element. Moreover, it receives the voltage $U_e$ and the voltage $U_s$. For this purpose, in the schematic circuit of FIG. 1, the control circuit has first and second input terminals respectively connected between the current limiting element 2 and the switching element 4, and between the switching element 4 and the capacitor 6 on the other hand.

The control circuit comprises a first comparator 10, the inverting input of which is connected to the first input terminal, and to the non-inverting input of which a first reference voltage V1 is applied. The output of the first comparator is applied to the set input S of a latch 14. The control circuit comprises a second comparator 12, the non-inverting input of which is connected to the second input terminal, and to the inverting input of which a second reference voltage V2 is applied. The output from the second comparator is applied to the reset input R of the latch 14. The output from the latch provides the control signal delivered by the control circuit, and is therefore connected to the control input of the switching element 4.

The converter of FIG. 1 operates as follows. It is assumed that the switching element is conducting. The capacitor 6 is charged by the current passing through the limiting element, the switching element, and the capacitor. When the voltage $U_s$ at the terminals of the capacitor exceeds the second reference voltage V2, the latch 14 changes state, and the switching element 4 becomes non-conducting. The charging of the capacitor ceases. Thus, the capacitor by the input voltage ceases charging as soon as the voltage at the terminals of the capacitor exceeds a limiting value dictated by the second reference voltage V2. Further, the non-conducting state of the switching element depends exclusively on the voltage $U_s$, but does not depend on the voltage $U_e$. This is not a problem. In fact, when the switching element is conducting, the voltage at its terminals is obviously zero (or very low), and making it non-conducting does not subject it to any particular stress, and does not cause problems from the EMC point of view. Of course, the switching element Q should preferably be able to withstand a voltage equal to the amplitude of the mains voltage. Here it is understood that the current limiting element could be omitted from the circuit of FIG. 1. Moreover, in the presence of this current limiting element, the value of the current flowing in the switching element is limited by the element 2. This may make it easier to dimension the switching element so that it withstands passage of the capacitor charging current.

Starting from this state, when the upstream voltage $U_e$ goes below the first reference voltage V1, the first comparator applies a signal to the set input of the latch, and the latch changes to a new state. The switching element is then turned on. As the conducting state does not depend on the downstream voltage, but only on the upstream voltage, it is possible to select the time at which it is made conducting, such that the voltage at the terminals of the switching element is as small as desired.

The circuit of FIG. 1 therefore makes it possible to preserve the dynamic range of the converter, and to protect the components. It therefore mitigates the second and third drawbacks of the Roy circuit, as explained above.

In the example of FIG. 1, the output voltage is measured at the terminals of the capacitor 6, and the input voltage is measured at the terminals of the series circuit of the switching element and of the capacitor. It will be noted that when the switching element is not conducting, the voltage at the terminals of the current limiting element is zero. As such, the input voltage may be measured equally at the terminals of the series circuit of the switching element and of the capacitor, or at the terminals of the circuit having the current limiting element, the switching element, and the capacitor in series. Similarly, when the switching element is conducting, the voltage at the terminals of the series circuit of the switching element and of the capacitor is equal to the voltage at the terminals of the capacitor 6, ignoring the voltage drop at the terminals of the switching element 4. Thus, if it is known when the switching element is conducting, it is possible to use the voltage at the terminals of the series circuit of the switching element and of the transistor to control the non-conducting state. More generally, the point of measuring the input voltage and the output voltage may vary depending on the solutions given in the examples of the figures.

In this embodiment, the converter also mitigates the first drawback because the switching times do not depend on the properties of the switching element. It would also be possible to use a converter of the type of FIG. 1 with a switching element of another type.

Figure 2:
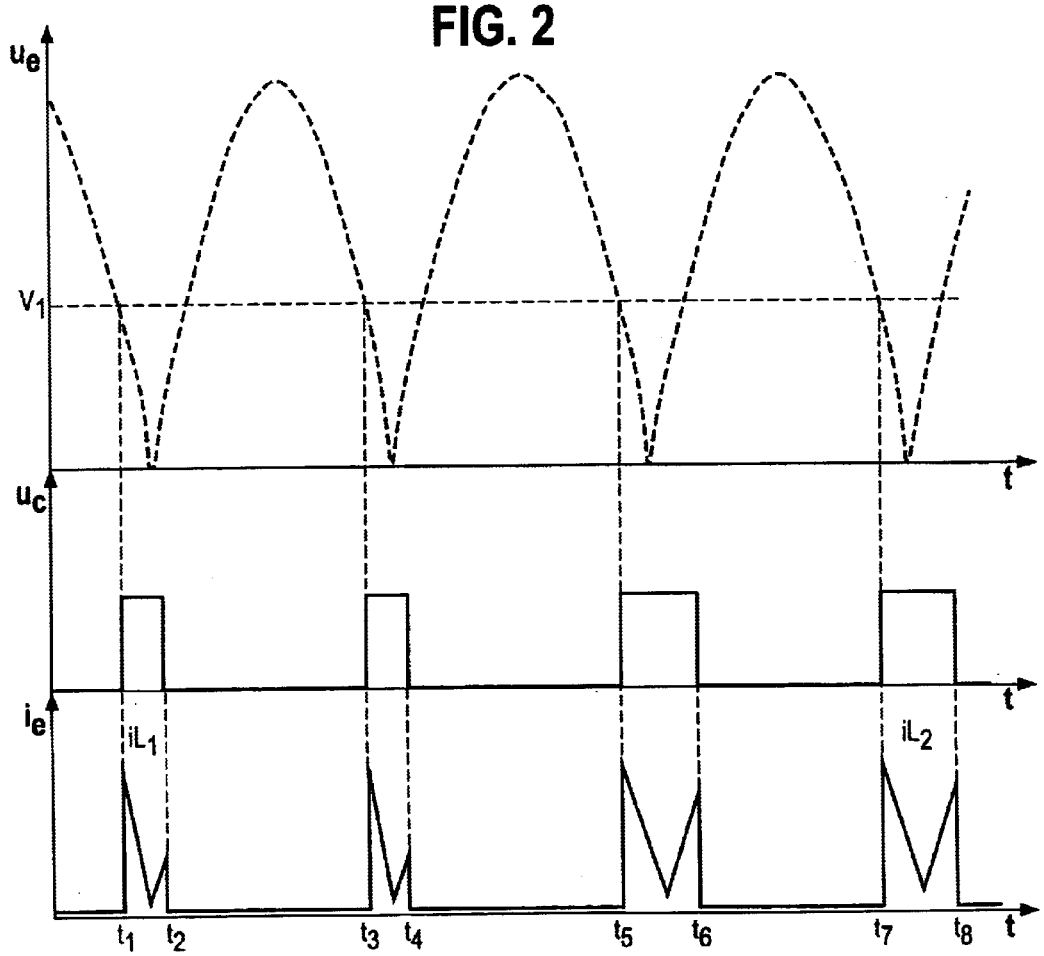
FIG. 2, a graph of the input voltage, of the control voltage and of the input current in the converter of FIG. 1, as a function of time.

FIG. 2 is a graph of the upstream voltage $U_e$ and of the control voltage $U_c$ in the converter of FIG. 1, as a function of time. In the example of this figure, the first reference voltage V1 is higher than the second reference voltage V2. This ensures that the capacitor is loaded not only on the rising edge of the rectifier input voltage, but also on the falling edge of the rectified input voltage.

The control voltage $U_c$ is the output voltage of the control circuit, applied to the control input of the switching element. The graph corresponds to the example of full-wave rectification, and shows several half-cycles. The upstream voltage or input voltage $U_e$ has been plotted in dotted lines on the figure; at time t=0, the input voltage is a maximum, and it is assumed that the switching element is not conducting. On the falling edge of the first half-cycle, the switching element becomes conducting at time $t_1$ when the upstream voltage $U_e$ goes below the first reference voltage V1. The capacitor is charged on the falling edge of the first half-cycle until the upstream voltage $U_e$ becomes less than $U_s$, and on the rising edge of the second half-cycle, as soon as the upstream voltage $U_e$ exceeds $U_s$ and until the downstream voltage reaches the threshold value V2, at time $t_2$. This time depends on the rate of charging of the capacitor, and therefore on the downstream consumption of the converter. The operation is similar on the falling edge of the second half-cycle, and on the rising edge of the third half-cycle, becoming conducting at time $t_3$ and non-conducting at time $t_4$.

It is assumed that the consumption of the device placed downstream of the converter then increases. On the falling edge of the third half-cycle, the switching element is switched on at time $t_5$, independent of the consumption. On the rising edge of the fourth half-cycle, the capacitor is charged more slowly because of the consumption of the device placed downstream of the converter. The threshold voltage V2 is only reached at a time $t_6$, with a charging duration $t_6$-$t_5$, which is greater than the charging duration $t_4$-$t_3$ during the previous cancellation of the voltage. The same phenomenon is found on the rising edge of the following half-cycle, at time $t_8$.

The graph also shows the control voltage $U_c$. It is found that this control voltage $U_c$ has marked rising and falling edges, which are representative of the times at which the switching element becomes conducting and non-conducting. The circuit therefore provides a voltage-calibrated signal (0±V), which exactly indicates the start and finish times at which the switching element becomes and ceases to be conducting. The duration for which this signal remains at the high level is representative of the downstream consumption of the converter.

It is also found that the times $t_1$, $t_3$, $t_5$ and $t_7$ of becoming conducting have a temporal position which is fixed with respect to the voltage half-cycles applied to the converter. This is explained by the fact that becoming conducting depends only on the voltage applied to the input of the converter, and does not depend on the output voltage. However, the times $t_2$, $t_4$, $t_6$ and $t_8$ at which the switching element becomes non-conducting are a function of the downstream voltage and of the output consumption of the converter. The circuit of FIG. 1 makes it possible, by analyzing the temporal position of these times $t_2$, $t_4$, $t_6$ or $t_8$, to measure the output consumption of the converter. This is explained in more detail below with reference to FIG. 5. This analysis may be carried out by measuring the time between the rising and falling edges of the control voltage.

Finally, the graph shows the shape of the line current, i, supplying the converter. In the vicinity of the zero voltage points, the graph is approximated. Depending on the consumption, the current has a waveform $iL_1$ or $iL_2$.

Figure 3:
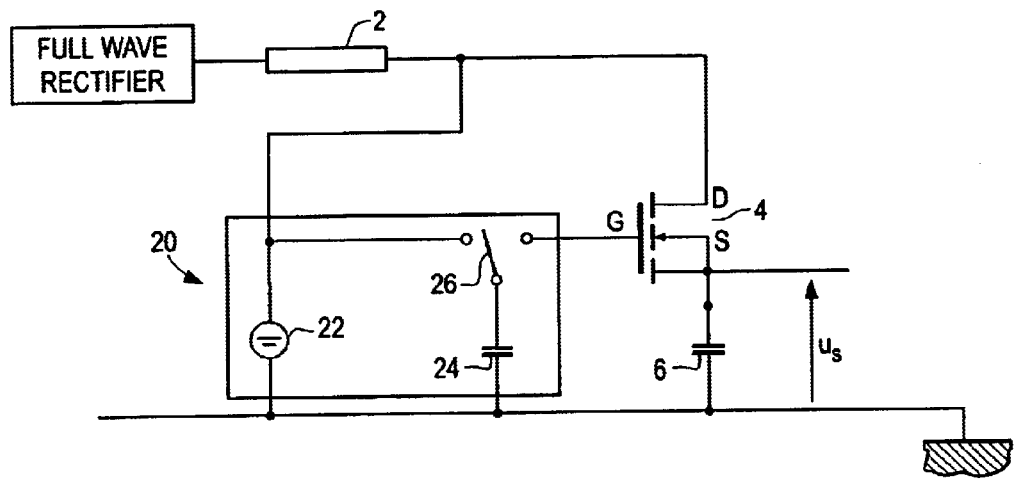
FIG. 3, a schematic view of a specific embodiment of a converter according to a preferred embodiment of the invention.

FIG. 3 is a schematic view of a converter according to a preferred embodiment of the invention. The example of FIG.

3 makes it possible to use a control circuit having a single input, while ensuring that the control circuit controls the conducting state (and the nonconducting state, respectively) from just one of the upstream and downstream voltages. This has the advantage of simplifying the converter structure. Furthermore, the circuit of FIG. 3 makes it possible to use a single voltage reference instead of the two voltage references shown in FIG. 1. The circuit of FIG. 3, like that of FIG. 4, uses an MOS transistor as a switching element. This MOS transistor is an example of a switching device which has a substantially constant conducting threshold between its control and output terminals, and only becomes conducting between its input terminal and its output terminal when this threshold is reached. As this threshold is constant when the transistor is conducting, the voltage $U_{gm}$ between the transistor gate and earth is equal to the sum of the output voltage $U_s$ and the conducting threshold VT of the transistor. The output voltage may therefore be measured, implicitly, from the output voltage of the control circuit, applied to the gate of the transistor.

In FIG. 3, the elements already described with reference to FIG. 1 can be recognized, which elements bear the same reference numbers and will not be described again. The switching element comprises an input terminal D, an output terminal S, and a control terminal G, the control voltage being applied between G and S, with the property of having a substantially constant conducting threshold VT between control G and output S terminals so that it becomes conducting between D and S when this threshold VT is reached.

Figure 4:
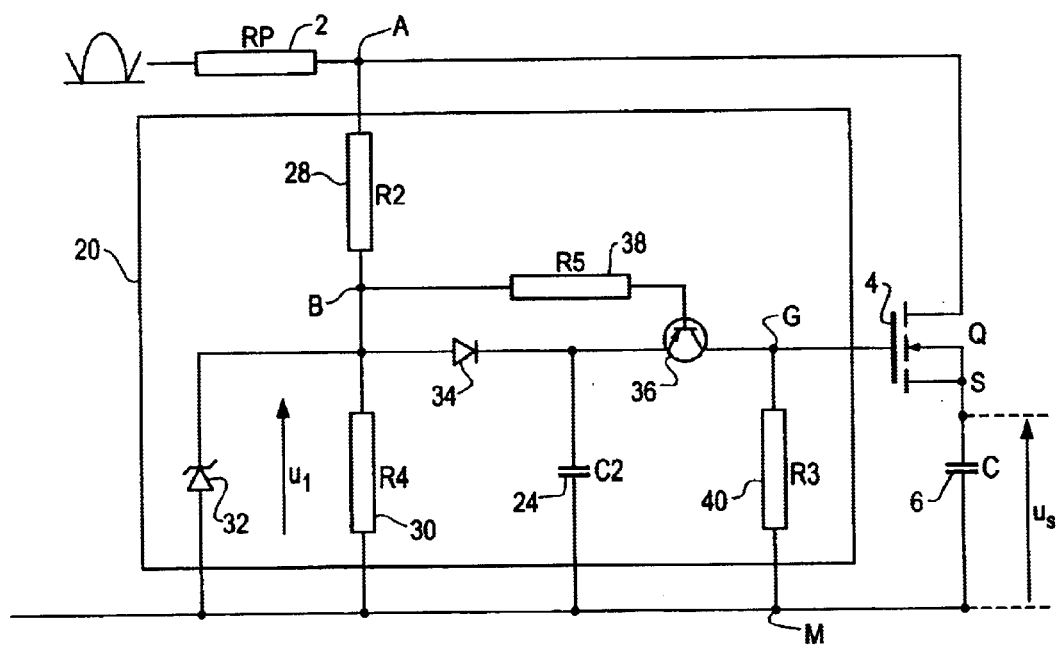
FIG. 4, a more detailed view of a converter of the type in FIG. 2.

The control circuit 20 has a single input connected between the current limiting element 2 and the switching element 4. Furthermore, it is connected to earth (also referred to as ground). The control circuit comprises a voltage source 22, which may be driven by the control input. The voltage provided by the source remains virtually constant while the input voltage of the control circuit, which is also the input voltage applied to the device, is greater than a first threshold, and otherwise decreases. FIG. 4 shows a practical implementation of such a voltage source. The control circuit further comprises a second capacitor 24 and a controlled inverter 26. The second capacitor has a memory function and has a terminal connected to the earth of the control circuit. The other terminal of the capacitor 24 is connected to the input terminal of the controlled inverter 26.

In its schematic representation, the controlled inverter is similar to a single-pole double-throw switch. The controlled inverter includes an input terminal, which is connected to the capacitor 24. Toggling or "moving" between the first and second position of the controlled inverter 26 essentially reciprocally couples the input terminal of the controlled inverter to either the control G of the switching element 4, or to the terminal of the voltage source, as shown in FIG. 3.

In one specific embodiment, a mechanical device having a wiper or component that physically moves or toggles may be used. Such a device may be a mechanical switch, a digitally controlled analog switch or equivalent device, as is known in the art. Preferably, such a mechanical device may be used only if the switching frequency of the controlled inverter was sufficiently low.

Alternatively, according to another specific embodiment, the controlled inverter may be a solid state device, such as a solid state switch. This may be a digitally controlled operational amplifier arranged to have a unity gain. Thus, such amplifiers act as an analog transmission gate. Moreover, digitally or analog controlled analog transmission gates may also be used, as is known in the art. Note, that the control input to the switching device, whether such control input or signal is analog or digital, is not specifically shown in FIG. 3, as operation of such a controlled inverter is known in the art.

The controlled inverter 26 alternates between the first and the second position. In the first position, the controlled inverter connects the second memory capacitor 24 to the voltage source 22. In the second position, the controlled inverter connects the second capacitor 24 to the output of the control circuit. Toggling or switching from the first to the second position takes place when the voltage from the voltage source 22 decreases. Toggling from the second to the first position takes place when the difference between the output voltage of the control circuit and the output voltage of the converter becomes less than the conducting threshold of the switching element.

The operation of the circuit of FIG. 3 is as follows. It is assumed at the start that the input voltage of the control circuit is greater than the first threshold V1, the switching element being assumed to be non-conducting. Since the input voltage of the control circuit is greater than the first threshold, the controlled inverter 26 is in the first position, and the second capacitor 24 is charged by the voltage from the source 22. There is no signal applied at the output of the control circuit to the control input of the switching element 4, which therefore remains nonconducting. When the input voltage decreases and goes below the first threshold, the voltage from the source 22 decreases, and the controlled inverter 26 goes into the second position. At this point, the memory capacitor 24 is connected to the output of the control circuit, and therefore applies a voltage to the control terminal G of the switching element. The switching element therefore becomes conducting; it is understood here that the memory capacitor is chosen so as to provide a voltage greater than the conducting threshold of the switching element, and this as soon as it is charged, even for a brief duration, by the source 22. It is also understood that the conducting state of the switching element depends only on the upstream voltage applied at the input of the control circuit when the switching element is not conducting.

Once the switching element becomes conducting, it remains conducting under the action of the memory capacitor 24 while the controlled inverter is in the second position. When the difference between the output voltage of the control circuit and the output voltage of the converter becomes less than the conducting threshold of the switching element, the inverter 26 goes from the second position to the first position. The switching element is then isolated. It is understood that the non-conducting state of the switching element depends only on the output voltage at the terminals of the capacitor, as measured across the output of the control circuit given the conducting threshold of the transistor, but does not depend on the input voltage applied to the converter.

Thus, as in the circuit of FIG. 1, the switching element becomes conducting as a function of the input voltage, but not as a function of the output voltage. The switching element becomes non-conducting as a function of the output voltage, but not as a function of the input voltage.

FIG. 3 complies well with the principle of FIG. 1, with a first implicit comparator monitoring the upstream voltage, via the driven voltage source and a second implicit comparator monitoring the downstream voltage via the voltage between G and S of the switching element.

In this specific embodiment, the first reference voltage, under which the switching element is conducting, may also be higher than the second reference voltage. This again makes it possible to load the capacitor in both the falling edge and the rising edge of the rectified input voltage.

FIG. 4 shows a more detailed view of a converter of the type of FIG. 2. The current limiting element, the switching element, the capacitor 6, the control circuit 20 and its second capacitor 24 will be recognized. The input of the control circuit (called A in the figure) is connected to earth through the series circuit of resistors R2 and R4 referenced 28 and 30. A Zener diode 32 connects the common terminal of the resistors 28 and 30, called B in the figure, to earth. This point B is also connected to one terminal of the second capacitor via a diode which is forward biased from B towards the second capacitor. The transmitter of a transistor 36 is connected to the second capacitor 24; the base of this transistor is connected to the point B through a resistor R5 referenced 38. The collector of the transistor is connected to the control input G of the switching element 4 and to earth through a resistor R3 referenced 40.

The voltage U1 is provided by the voltage source to the point B. When the voltage U1 is applied between the control input G of the switching element and earth, the switching element Q conducts if the voltage UGS is greater than or equal to the conducting threshold, therefore while the output voltage US is less than U1−VT. The downstream threshold V2 is in this case therefore equal to U1−VT. The value U1 is determined for a given threshold, and for a given MOS.

In the circuit of FIG. 4, the inverting contact K is in fact produced by combining the diode 34, the transistor 36 and the resistor R5 38. The second capacitor 24 is charged by placing the latter in parallel with the Zener diode 32, through the diode 34.

It will be assumed for the sake of clarity that the voltage at the terminals of the diode 34 when it is conducting is very small compared to the Zener voltage VZ of the Zener diode 34. Therefore, we simply have U1=VZ=V2+VT. The value of the Zener voltage is therefore chosen as a function of the conducting threshold of the switching element 6, and of the second reference threshold V2 (or downstream threshold), above which the switching element becomes non-conducting.

The second transistor 36 is always off, unless the potential at B becomes less than that at E. The latter situation is encountered when the Thevenin generator equivalent of the assembly (UA, R2, R4) has a voltage less than VZ.

If, following the decrease of UA on a falling edge of the rectified half-sinusoid, the voltage U1 becomes less than the Zener voltage VZ, then the second transistor starts to conduct, leading to the switching element starting to conduct. If the switching element starts to conduct, the potential of A decreases, and therefore that of B also decreases, which further reinforces the conduction of the second transistor, etc. There is therefore a cumulative effect.

At the virtual instantaneous moment when the second transistor and the switching element become conducting, the potential of A goes from the threshold value V1 to the value $U_s$ (voltage at the terminals of C), thus confirming the conduction of the second transistor and switching off of the diode 34.

For a given Zener voltage VZ, and for a chosen threshold V1, the values of resistors R2, R4 to be used are calculated from the equation:

$$V1 = \frac{R2+R4}{R4} \quad VZ = \frac{R2+R4}{R4}(V2+VT)$$

By choosing suitable resistors R2 and R4, the circuit makes it possible for the upstream and downstream thresholds V1 and V2 to be chosen freely Again, one may select V1 higher than V2 for ensuring that the capacitor is loaded on both the falling and rising edges of the input voltage.

The voltage UGM at the terminals of the resistor R3 40 remains equal to VZ during the conduction duration, if the time constant R3*C2 is high compared to the period, where C2 is the capacitance of the second capacitor.

When the voltage at the terminals of the capacitor 6 increases enough to reach VZ−VT, then the conduction of the switching element tends to decrease, and UA increases. The second transistor tends to conduct less, etc. There is a cumulative effect in the other direction: the switching element and the second transistor switch off. The voltage UGM is therefore switched off. There is therefore, if necessary, a voltage-calibrated signal, UGM, representative of the conduction duration, as explained with reference to FIG. 2.

The circuit of FIG. 4 provides a simple solution for implementing the diagram of FIG. 3. Of course, other solutions are possible without departing from the scope of this invention.

Applications of the circuit of FIGS. 1 to 4 to measuring the downstream consumption of the converter—FIGS. 7 and 8—or to transmitting data along a supply line—FIG. 9 onwards, will now be described with reference to FIG. 5.

Figure 5:
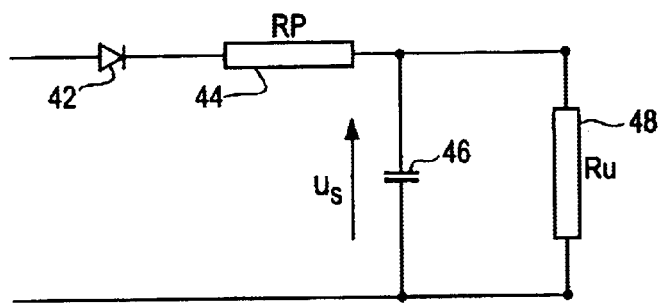
FIG. 5, a representation of a conventional rectifying circuit supplying power to a load RU, with filtering by a capacitor.
Figure 6:
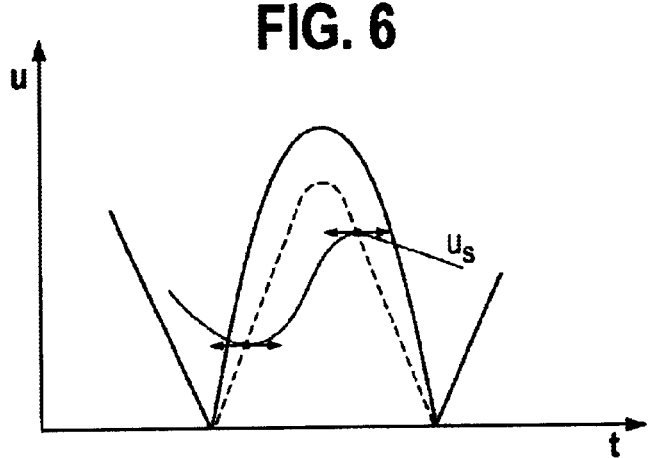
FIG. 6, a graph of the output voltage of the circuit of FIG. 4.

FIG. 5 shows a representation of a conventional rectifying circuit, which supplies power to a load RU, with filtering by a capacitor. The circuit comprises a diode 42 providing half-wave rectification, a current limiter formed by a resistor 44, and a parallel circuit of a capacitor 46 and of an output load RU referenced 48. The output voltage $U_s$ is the voltage at the terminals of the capacitor. FIG. 6 is a graph of the output voltage of the circuit of FIG. 5. A half-cycle of the voltage applied at the input to the circuit is shown in solid line, and the theoretical maximum amplitude at the terminals of the load, which is calculated from the previous curve by reducing the ratio RU/(RP+RU), is shown in dotted line, while the output voltage is shown in bold line. In such a circuit, it is known that the waveform of the output voltage $U_s$ is directly related to the current absorbed by the load arranged in parallel on the capacitor. The exact measurement of such a waveform is enough to determine this current, either by calculation, or from a calibration curve. However, this measurement requires knowing both the minimum and maximum of the voltage graph $U_s$, identified by their horizontal tangents in FIG. 6. This involves continuous sampling of the output voltage so as to determine the minimum and maximum of the output voltage.

Conversely, as explained with reference to FIG. 2, the control voltage of the switching element in the circuit of FIG. 1, 3 or 4 has rising edges in a temporal position which is fixed with respect to the time where the voltage is zero, and falling edges whose position is representative of the consumption downstream of the converter. It is therefore possible, by measuring the switching times of the switching element, to determine the consumption downstream of the converter. This only depends on the second reference voltage to which the output voltage is compared for opening the switching element. Therefore, such power consumption measurement is possible even where the first reference voltage to which the input voltage is compared for closing the switching element, is lower than the second reference voltage.

Figure 7:
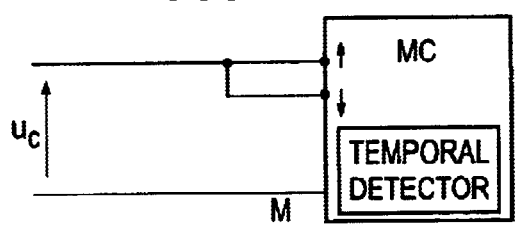
FIGS. 7 and 8, schematic views of specific embodiments of microcontrollers capable of being used according to the invention in its application to measuring the current output in the downstream direction (or output current)
Figure 8:
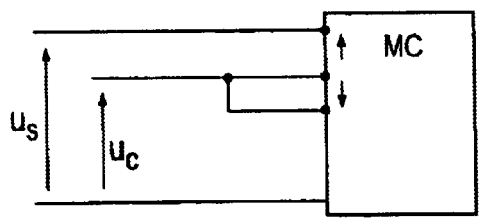

FIGS. 7 and 8 show schematic views of microcontrollers adapted to be used according to the invention in its application to measuring the current output downstream of the converter. FIG. 7 shows a microcontroller which receives as an input the control voltage $U_c$ shown in FIG. 2. The microcontroller is adapted to measure the duration for which this control voltage remains at a high level. What is required is for this is to count the pulses of an internal clock, the counter being activated during the high state of the control voltage. As indicated with reference to FIG. 2, this duration is representative of power consumption downstream of the converter. The circuit of FIG. 7 allows a simple measurement of the consumption, without it being necessary to sample the signal in order to determine its minima and its maxima.

FIG. 8 shows another circuit based on the observation that in the converter of FIG. 1, 3 or 4, the extrema of the output voltage are reached at the times of switching the switching element, and that these switching times are accurately provided by the rising and falling edges of the control voltage of the switching element. The microcontroller of FIG. 8 therefore receives as inputs the control voltage and the output voltage of the converter. The output voltage is applied to an analog input. In a first example, the control voltage $U_c$ activates an interrupt of the microcontroller. The latter then measures the output voltage only on the rising and falling edges of the control voltage. In a second example, the control voltage $U_c$ directly activates the sampling control on its rising and falling edges. In one case as in the other, the output voltage does not have to be continuously sampled for determining its extrema, and it is possible to easily determine power consumption downstream of the converter. The converter proposed above therefore makes it possible to measure the consumption more simply, without requiring complete sampling of any signal FIGS. 9 and following describe downstream operating methods applicable to devices such as actuators, to which power is supplied by converters such as described in reference to FIGS. 1, 3 and 4. These methods enable data to be transmitted from the devices. One or more converters of the type described above is or are assumed to be connected to the same power supply line on the AC mains. The problem, as stated above, is to transmit a signal upstream from one of the converters, for example, to the electrical switchboard of the supply line. The actuators using a converter according to the invention are, for example, motors comprising control electronics, to which power is supplied by the converters. The terms "load" or "actuator" are also used herein to designate devices connected at the output of the converters, and to which power is supplied by the converters.

The solution proposed here is based on the observation that the current $i_e$ input to the converter, shown in FIG. 2, has rising and falling edges coinciding with the rising and falling edges of the control signal. The timing of these current edges is therefore also representative of the consumption of a device connected to the converter. A variation in consumption may be detected upstream by a simple measurement of the current supplied to the converter.

At rest, each device receives a current and therefore causes upstream of the converter a line current or input current $i_e$ whose shape is shown in FIG. 5 of Lewis, or in FIG. 2 of EP-A-0 763 878 (Helfrich 1995). This current is in the form of a series of pulses, 2 or 4 pulses over one period of the mains, as a function of half- or full-wave rectification. As explained above, for the dual-threshold converters of the type described in FIGS. 1, 3 and 4, the duration of the pulse (or of the dual pulse) is the same as that of the control voltage. This duration is directly related to the consumption of the converter and of its associated load.

In the case of full-wave rectified devices, a first waveform $iL_1$ of the line current $i_e$ will be attained for the rest state, and a second form $iL_2$ of this current will be attained in the active state, as shown in FIG. 2. The over-consumption may be due, for example, to the fact that the device in the active state supplies a relay coil enabling the motor of the actuator. It is possible for the consumption to be determined remotely from the pulse shape. It is possible to measure the duration of each pulse. It is also possible, since each pulse starts at a particular temporal position, to measure the time difference between consecutive pulses. Thus, the difference between the falling edge of one pulse and the rising edge of the following pulse is measured. In the example of FIG. 2, a duration $T_1=t_3-t_2$ is obtained for a first consumption, and a duration $T_2=t_7-t_8$ is obtained for a second consumption. It should be noted that if the supply device controls a motor, the total line current $i_e$ then corresponds to the superposition of the current $iL_2$ and of the current iM absorbed by the motor, this latter current being sinusoidal.

It is therefore clearly possible, by measuring the current supplied to a converter to determine the consumption of a device connected to the output of this converter. This enables data to be transmitted, by acting on the consumption of the device in order to vary the current supplied to the converter. It is therefore possible to transmit data from a device connected a the output of a converter to any point of the line supplying the converter with AC current.

By way of example, it is possible to detect an alarm or a fault in the device to which power is supplied by the converter. All that is required for this is that the consumption of the device varies in the case of an alarm or fault. For example, provision may be made for the device to be programmed to supply power to a passive element in the case of an alarm or fault, or more generally, of data to be transmitted. The corresponding variation in duration between pulses of the input to the converter enables the alarm or the fault to be remotely detected. In this case, an over-consumption, i.e. an increase in the pulse duration or a reduction in the duration separating the pulses, is detected. It could also be decided to decrease the consumption, either deliberately or simply by taking the device out of the circuit, which would have the effect of decreasing the pulse duration, or of increasing the duration between two successive pulses.

The method also functions in the presence of a plurality of converters and of associated devices, connected in parallel on the same power supplying line. The converters and the devices may be identical, or at the very least, may have identical pulse durations. It is assumed that the devices are at rest, i.e. in the state where the duration between pulses is $T_1$. As explained above, it would also be possible to consider the pulse duration. The duration between pulses is considered by way of example herein. The superposition of the rest currents of all the devices causes a resulting pulsed current of higher amplitude, the amplitude being given by the sum of the amplitudes of the various individual currents, but still characterized by the duration $T_1$.

FIG. 9 shows a partial graph of the input current to a converter, in a first operating state, characterized by a duration $T_1$ between two pulses. In the figure, only the end of one pulse and the start of the following pulse are shown. FIG. 10 shows a graph of the current input to three identical converters, all in the same first operating state. As indicated above, the duration between two pulses is still $T_1$—but the amplitude of the current is higher.

Now it is assumed that an alarm, a fault or a motor start-up, is detected by one of the devices. The latter is, for example, programmed to supply power to a passive element upon a fault, which causes an over-consumption characterized by a duration $T_3$ between two pulses, where $T_3<T_1$, according to the measurement convention adopted. A current having the shape shown in FIG. 11 is then measured on the supply line. The time between successive pulses is now $T_3$, at least when the current is nearly zero.

It is possible to take a duration $T_3$ equal to the duration $T_2$ corresponding to another operating mode. Similarly, two different values may be preferred. If a duration $T_3=T_2$ is taken, the difference between starting up a device, which leads to an over-consumption and a reduction in the duration at $T_2$—and an alarm, which has the same effect, cannot be distinguished. If the two durations are different, it is possible to differentiate between start-up of a device and an alarm generated by this device. It is understood that it is generally possible to detect a variation in consumption, and that this variation may take different values depending on requirements. It could be possible, for example, to generate various over-consumptions using various passive elements, by connecting one or more of these elements to the output of the converter. This is only one example of a code allowing transmission of data from a device supplied in power by the converter through the supply line of the converter. It is possible to choose various over-consumptions for the devices supplied by the various converters. This would make it possible to identify, in the case of data transmission by a device, which of the devices has transmitted the data, by a single measurement of the duration separating the pulses. It would also be possible to detect a simultaneous alarm on various converters, if required, by analyzing the pulse shape.

Upstream, a pulse-width detector or a detector of the time separating the pulses may be used for detection. Such a detector is placed upstream on the common input line. This detector may be designed to be activated as soon as the current exceeds a given threshold, less than the amplitude of the pulses produced by just one of the devices at rest. The time measurement may be carried out by a microcontroller. If necessary, synchronization on the mains removes any ambiguity, this synchronization being even simpler because the timing of the rising edge of a current pulse relative to the sinusoidal input voltage is known.

Figure 12:
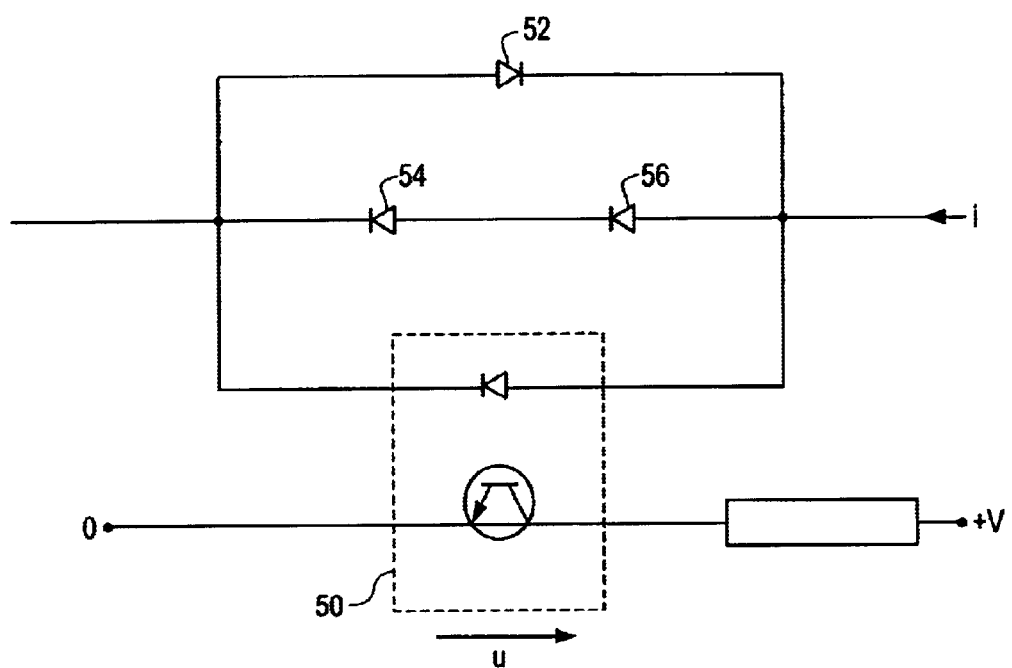
FIG. 12, a schematic representation of a detector for detecting a change of operating state of a device connected to an output of this converter.

Producing the detector calls on known techniques. FIG. 12 shows an example of a detector. The latter comprises an optical coupler 50, with enough gain to work in saturation when just one of the devices is supplied, with its rest consumption. Diodes 52, 54, 56 placed in parallel on the LED of the optical coupler make it possible to divert the current when it exceeds the level which the LED can withstand. The voltage measured at the terminals of the optical coupler provides a signal representative of the current.

The current sensor may also be a pulse transformer, or any device capable of eliminating the 50 (60) Hz or 100 (120) Hz components, highlighting the sharp edges at the start and end of the pulses. It then becomes possible to detect data, even superimposed on the supply current In this case, this situation is all the more advantageous since the principle of power supply ensures that the current spikes are located at times close to the time when the main voltage goes to zero; this is favorable to the measurement.

The alarm or fault detection electronics compares the duration T measured to a fixed threshold TA between the values $T_1$ and $T_3$. The duration $T_1$ may be acquired by learning. The discrimination threshold of an alarm, TA, is deduced therefrom by a given offset.

In a product configuration phase, the state feedback may also be encoded by a series of different states $T_1$, $T_3$. From this point of view, it is clear that the second embodiment, with temporal detection, has advantages. Furthermore, it should be noted that this form makes it possible to discriminate clearly between a consumption state leading to a duration $T_3$ (alarm) which is different from $T_1$ (rest) and $T_2$ (motor actuation). Under these conditions, the fault detection can be continuously active, without it being necessary to validate it by an alarm or detection mode under overall control. Finally, the second embodiment lends itself more easily to encoding the transmission of a series of binary data, as described in Pezzolo.

Of course, the invention is not limited to the embodiments given above. Thus, the load capacitor may be produced in different ways, and may include, for example, several discrete components. Functionally, it is a capacitor, and it is therefore denoted as such. Similarly, the current limiting element may also comprise one or more coils with one or more iron cores. In the examples, the terminals of the capacitor constitute the output terminals of the converter; there is nothing to prevent other elements being provided in parallel or in series with the capacitor, since the output voltage arises from discharging the capacitor.

It is indicated above that the conducting state of the switching element depends "exclusively" on the upstream voltage, or input voltage, or rectified input voltage. It is also indicated that the non-conducting state depends "exclusively" on the downstream voltage, or output voltage, or voltage at the terminals of the capacitor. In either case, this may not be exactly precise because both the conducting state and the non-conducting state may depend on other factors, for example, reference voltages V1 and V2 in the circuit of FIG. 1, the values of the resistors forming the voltage divider, or other factors. It is therefore necessary to understand the term "exclusively," as used herein, means that the conducting state depends on the upstream voltage, without being a function of the downstream voltage, and that the non-conducting state depends on the downstream voltage, without being a function of the upstream voltage.

In the circuit of FIGS. 1, 3 and 4, the current limiter is located upstream of the series circuit of the switching element and of the capacitor, and upstream of the input of the control circuit. This position has no impact on the operation of the current limiter. Because of this, the current limiting function is provided as soon as the current limiter is in series with the switching element and the capacitor. This position also has no effect on the conducting state. It would be possible to measure the voltage controlling the conducting state at the terminals of the series circuit of the current limiter, of the switching element and of the condenser, without this changing the overall operation of the device described in FIG. 1. This is because when the switching element is not conducting, the voltage at the terminals of the voltage limiter is zero. It would therefore be possible to place the voltage limiter, or a part thereof, between the input terminal of the control circuit and the switching element.

However, the proposed position of the voltage limiter has the advantage of providing, in the circuit of FIG. 4, the cumulative effect described above. If the voltage limiter or a part thereof is placed between the input of the control circuit and the switching element, the circuit does not benefit from this cumulative effect.

The converter of FIGS. 1, 3 and 4 enables a simple measurement of the consumption, and simple data transmission along the power supply line to the converters. This measurement and this transmission could also be implemented with known converters. Their implementation would be made more complex, to the extent that these converters of the prior art do not have a conducting state which is known in advance at any precise moment, like those described above.

The description given with reference to FIG. 9 onwards in the example of full-wave rectification is also applicable to the example of half-wave rectification.

Specific embodiments of an unregulated electrical converter according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein

What is claimed is:

1. A voltage converter with input terminals, having a series circuit between the input terminals, the series circuit comprising:
    a switching element and a capacitor, the discharge of the capacitor supplying an output voltage of the converter, and
    a control circuit adapted to cause the switching element to conduct when an input voltage is less than a first threshold, irrespective of the output voltage, and adapted to cause the switching element not to conduct when the output voltage is greater than a second threshold, irrespective of the output voltage, wherein the first threshold is higher than the second threshold.

2. The converter of claim 1, further including a half-wave or full-wave rectifier, the output of which supplies the series circuit.

3. The converter of claim 1, further including a current limiting element in series with the series circuit.

4. The converter of claim 1, wherein the switching element is a MOS transistor.

5. The converter of claim 1, wherein the switching element further includes
    an input terminal, an output terminal, and a control terminal;
    a control voltage supplied by the control circuit and applied between the control terminal and the output terminal; and
    wherein the switching element has a substantially constant conducting threshold between the control terminal and the output terminal, the switching element conducting between the input terminal and the output terminal when the conducting threshold is reached.

6. The converter of claim 5, wherein the control circuit has a single input connected to one terminal of the series circuit, one output connected to the control terminal of the switching element, and wherein the other terminal of the series circuit is connected to ground.

7. The converter of claim 6, wherein the control circuit further includes
    a voltage source driven by said single input, the voltage source adapted to deliver a voltage which remains substantially constant while the input voltage is greater than a first threshold, and otherwise decreases;
    a second capacitor, one terminal of which is connected to ground, and
    a controlled inverter, an input terminal of which is connected to the other terminal of the second capacitor, and which is adapted to selectively connect the second capacitor to the voltage source in a first position, and to the output of the control circuit in a second position.

8. The converter of claim 7, wherein the controlled inverter is adapted to toggle from the first position to the second position when the voltage delivered by the voltage source decreases.

9. The converter of claim 7, wherein the controlled inverter is adapted to toggle from the second position to the first position when the output voltage is greater than a second threshold.

10. The converter of claim 7, wherein the controlled inverter is adapted to toggle from the second position to the first position when a difference between the output voltage of the control circuit and the output voltage of the converter is less than the voltage threshold of the switching element.

11. The converter of claim 7, wherein the controlled inverter further includes
    a first diode between the voltage source and the second capacitor;
    a second transistor of the bipolar type, an emitter of which is connected to the second capacitor, and a collector of which provides the output of the control circuit; and
    a resistor between the voltage source and a base of the second transistor.

12. The converter of claim 11, wherein the voltage source further includes a Zener diode connected between ground and an anode of the first diode, wherein the Zener diode is connected to the input of the control circuit through a resistor, and said Zener diode placed in parallel with a second resistor.

13. The converter of claim 1, further including means for measuring a temporal position of at least one falling edge of a control voltage applied to the switching element.

14. The converter of claim 1, further including means for measuring a value of the output voltage, the means for measuring being controlled by a control voltage applied to the switching element.

15. A circuit comprising:
    a voltage converter with input terminals, the voltage converter including
    a series circuit between the input terminals, the series circuit including a switching element and a capacitor, the discharge of the capacitor supplying an output voltage of the voltage converter;
    a control circuit adapted to cause the switching element to conduct when an input voltage is less than a first threshold, irrespective of the output voltage, and adapted to cause the switching element not to conduct when the output voltage is greater than a second threshold, irrespective of the output voltage, wherein the first threshold is higher than the second threshold; and
    a load fed by the output voltage of the converter.

16. The circuit of claim 15, wherein the load is adapted to generate over-consumption.

17. The circuit of claim 16, wherein the load has at least one passive element selectively supplied by the output voltage.

18. A device having at least one circuit, the at least one circuit comprising:
    (a) a voltage converter with input terminals, the voltage converter having a series circuit between the input terminals, the series circuit including a switching element and a capacitor, the discharge of the capacitor supplying an output voltage of the voltage converter;

(b) a control circuit adapted to cause the switching element to conduct when an input voltage is less than a first threshold, irrespective of the output voltage, and adapted to cause the switching element not to conduct when the output voltage is greater than a second threshold, irrespective of the output voltage, wherein the first threshold is higher than the second threshold;

(c) a load fed by the output voltage of the converter; and the device having a current sensor configured to sense current supplied to the voltage converter.

19. The device of claim 18, wherein the current sensor senses a width of current pulses.

20. The device of claim 18, wherein the current sensor senses a time separating current pulses.

21. A method of transmitting data from a load connected to a conversion device, the method comprising the steps of:

(a) providing a voltage converter with input terminals, the voltage converter including a series circuit between the input terminals, the series circuit including a switching element and a capacitor, the discharge of the capacitor supplying an output voltage of the converter;

a control circuit adapted to cause the switching element to conduct when an input voltage is less than a first threshold, irrespective of the output voltage, and adapted to cause the switching element not to conduct when the output voltage is greater than a second threshold, irrespective of the output voltage, wherein the first threshold is higher than the second threshold;

(b) connecting the load to the voltage converter so that the output voltage of the voltage converter is supplied to the load;

(c) varying a power consumption of the load; and (d) detecting a variation in a temporal position of at least one current pulse in a current input to the voltage converter.

22. The method of claim 21, wherein the step of detecting further includes detecting a variation in a temporal width of at least one current pulse.

23. The method of claim 21, wherein the step of detecting further includes detecting a variation in a time between a falling edge of a current pulse and a rising edge of a following current pulse.

24. The method of claim 21, wherein the step of varying is carried out upon an alarm condition.

* * * * *